United States Patent [19]

Dreese et al.

[11] 4,377,601
[45] Mar. 22, 1983

[54] METHOD OF REMOVING HULLS FROM BREWER'S SPENT GRAIN

[75] Inventors: Patrick C. Dreese; R. Carl Hoseney, both of Manhattan, Kans.

[73] Assignee: Miller Brewing Company, Milwaukee, Wis.

[21] Appl. No.: 299,511

[22] Filed: Sep. 4, 1981

[51] Int. Cl.³ ............................................. A23B 4/04
[52] U.S. Cl. ..................................... 426/472; 426/31; 426/462; 426/473; 426/482
[58] Field of Search ................. 426/31, 472, 473, 462, 426/482

[56] References Cited

U.S. PATENT DOCUMENTS

| | | | |
|---|---|---|---|
| 580,834 | 4/1897 | Wricht | 426/472 X |
| 679,065 | 7/1901 | Tilden | 426/472 |
| 2,225,428 | 12/1940 | Christensen | 426/472 X |
| 2,396,234 | 3/1946 | McDowell et al. | 426/31 |
| 2,420,567 | 5/1947 | Selman et al. | 426/472 X |

FOREIGN PATENT DOCUMENTS

| | | | |
|---|---|---|---|
| 2940859 | 4/1981 | Fed. Rep. of Germany | 426/31 |
| WO79/00269 | 11/1979 | PCT Int'l Appl. | 426/31 |

Primary Examiner—Robert L. Lindsay, Jr.
Attorney, Agent, or Firm—Quarles & Brady

[57] ABSTRACT

Hulls are removed from brewer's spent grain (BSG) by drying and milling the BSG in a roller mill having a differential of about 2.5 to about 4.0 and a tight setting, followed by passing the milled mixture through a No. 36 light wire sieve which retains the hulls and permits the bran to pass through. An improved method of making bread with bran which comprises thoroughly mixing the bran with oil and surfactant before adding the other bread ingredients is also described.

2 Claims, 1 Drawing Figure

METHOD OF REMOVING HULLS FROM BREWER'S SPENT GRAIN

The present invention relates generally to a method of treating brewer's spent grain, a by-product of the brewing industry. More particularly, it relates to a method of removing hulls from brewer's spent grain to obtain a bran product that can be used for human consumption. It also relates to a novel method of adding oil and surfactant to bread dough containing bran to prevent volume loss upon baking.

BACKGROUND OF THE INVENTION

In the first stage of brewing a mash is prepared by adding water to ground malt which, in many cases, also contains a cooked carbohydrate adjunct such as corn grits or rice. The temperature is raised to favor the enzymatic hydrolysis of the carbohydrates in the mash. When hydrolysis is complete the liquid (wort) is filtered through the solid residue. The wort continues through the brewing process and eventually becomes beer. The solid residue which remains after filtration of the wort is called brewer's spent grain (BSG) and is a by-product of the brewing industry. Twelve and a half pounds (dry basis) of BSG are produced for every barrel of beer, amounting to over 700,000 tons dry weight annually in the United States. The large amount of BSG produced has, at times, been a disposal problem. The most common use of BSG has been as a feed for ruminants.

The spent grain consists mainly of the pericarp and hull portions of the barley and of nonstarchy parts of corn if corn grits are used as an adjunct. Although "spent" in terms of carbohydrate, BSG is higher in protein, lipids, and fiber than was the original barley-adjunct mixture.

Efforts to convert the BSG into an additive for food products for human consumption have been handicapped by the presence in the BSG of barley hulls. The barley hulls have a rough texture and when ground tend to break into long sharp slivers which are unpalatable and difficult to remove.

There are three objectives which could be fulfilled by putting BSG in human food:
1. The protein and fiber contents of the food containing the BSG would be increased.
2. By direct human consumption, better utilization of the food resource would be made.
3. The brewers who produce the BSG would be paid a higher price for their product.

In order for those three objectives to be fulfilled, appreciable quantities of food containing BSG would have to be consumed.

There is evidence that indicates that lack of dietary fiber in the human diet may contribute to the occurrence of certain noninfectious diseases such as diverticulosis, colon cancer, hemorrhoids, arteriosclerosis, varicose veins and appendicitis.

Dietary fiber is normally defined as the skeletal components of the plant cell which are resistant to digestion by enzymes in the human digestive tract. Dietary fiber includes hemicelluloses, pectin substances, gums and other carbohydrates as well as lignin and cellulose. BSG, because it is high in both fiber and protein, is a good candidate to be added to human food as a protein and fiber supplement.

Dietary fiber is in demand because of the benefits which are said to accompany its consumption. The physiological claims for dietary fiber include its use for relieving constipation by increasing the water content of the feces, for treating or preventing diverticular disease and for possibly reducing serum cholesterol. Therefore, there is an interest in supplementing processed food products for human consumption with dietary fiber. Most of the dietary fiber which is added to such food products today comes from white wheat bran. Other sources include oats, corn bran, soy bran, rice bran and finely divided cellulose, including wood cellulose.

In the past, various efforts have been made to incorporate BSG into bread and bakery products.

Finley and Hanamoto (Cereal Chem. 57:166, 1980) milled BSG on a Quadramat Sr. flour mill into two bran fractions, a shorts fraction, and a flour fraction. Each fraction was added to a bread formula at 6 and 12% flour replacement levels. Loaf weights and volumes were measured and loaf quality characteristics were judged. The two bran fractions depressed loaf volume less and were less detrimental to bread quality than the flour or shorts fractions, but at the 12% replacement level all bread was judged unsatisfactory. No attempt was made to alter the fractionation made by the milling system and no special treatments were used to improve the quality of the bread containing the BSG.

In another bread study, Prentice and D'Appolonie (Cereal Chem. 54:1084, 1977) used BSG in bread at 5, 10, and 15% flour replacement levels. The bread was evaluated by a taste panel and compared to a control that contained 30% whole wheat flour and 70% wheat flour. There was no significant preference shown between the control and bread containing 5 and 10% BSG. The 30% whole wheat control was significantly preferred over the bread having 15% BSG.

Prentice et al. (Cereal Chem. 55:712, 1978) replaced soft wheat flour with ground BSG in cookie formulas. They found that the addition of soy lecithin to a cookie dough containing BSG improved cookie quality.

A survey conducted by the USDA to determine consumer awareness and attitudes on food grading showed that consumers are more concerned about the quality of bread than nutrition or any other characteristic. Quality was important to 61%, type of bread to 35.9%, brand to 33.8%, price to 30.9%, ingredients to 16.3%, and nutrition to only 8.7%. Therefore, the nutritional value alone will not be sufficient to sell BSG. If the three objectives listed above are to be met by putting BSG in bread, a high quality bread containing BSG must be made.

SUMMARY OF THE PRESENT INVENTION

It is an object of the present invention to disclose a process for making a novel BSG bran product which can be used in bread and other products for human consumption.

It is a further object to disclose a method of using the novel BSG bran product in the bread-making process to obtain acceptable bread products.

In the method of the present invention of treating brewer's spent grain to obtain a fibrous product suitable for use in food products for human consumption, the brewer's spent grain (BSG) is dried and milled or ground in a roller mill having a differential of about 2.5 to about 4.0 and preferably 3.5 and a tight setting so that the rollers just rub when no product is passing through. The use of the roller mill greatly reduces the splintering of the barley hulls. The ground mixture is then passed through a No. 36 (500 m.) light wire screen to remove the barley hulls. The ground product which passes through the screen is collected. It is substantially free of splintered barley hulls and contains both protein and dietary fiber. It can be considered brewer's spent grain (BSG) bran and can be substituted for white wheat bran and other bran products in bread, other baked products, extruded cereal products and other products for human consumption.

In the method of the present invention of using BSG bran in the bread-making process, the BSG bran is thoroughly mixed with oil and a surfactant in a mill before adding the other bread ingredients. The resulting bread has good volume, grain and texture.

DETAILED DESCRIPTION OF PREFERRED EMBODIMENT

Figure 1:
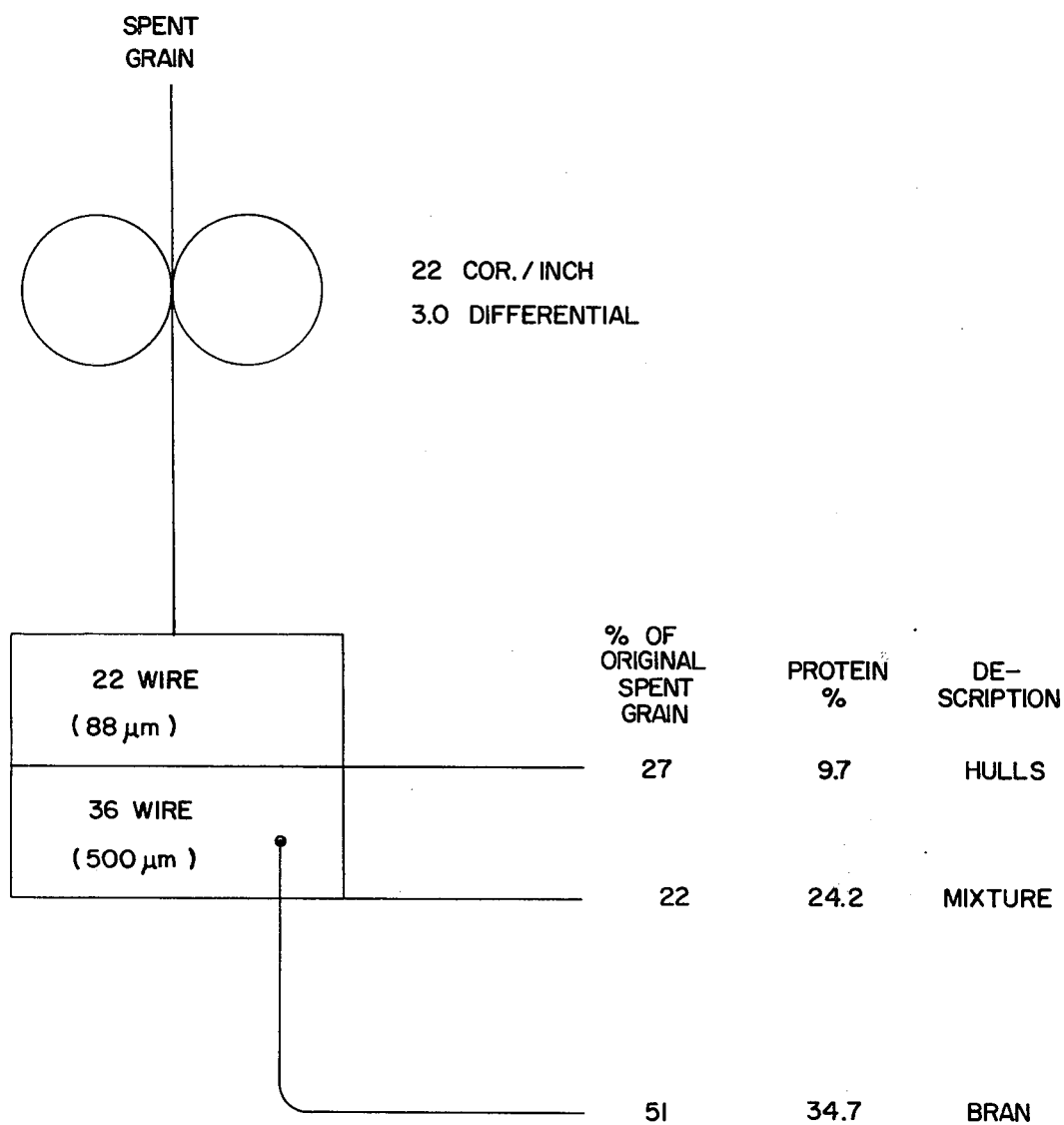
FIG. 1 is a schematic diagram of the preferred milling procedure for removing hulls from brewer's spent grain.

In the preferred practice of the method of the present invention the BSG is first dried.

The brewer's spent grain as it is taken from the wort filter contains a significant quantity of liquid wort which can be physically separated from the spent grain, preferably by use of a press or a centrifuge. The partially dewatered spent grain may then be transferred from the centifuge to a dryer by a series of screw conveyors. The transfer is preferably accomplished under sanitary conditions by blanketing the conveyors with steam. The spent grain is dried to reduce the moisture content to less than about 15%, and preferably about 9%, before milling.

The dried brewer's spent grain thus obtained contains about 28% to 30% protein and about 50% to 55% dietary fiber. It is then ground in a roller mill having the differential of about 3.5 and a tight setting so that the rollers just rub when no product is being milled. A single pass through the roller mill is sufficient to remove the bran from the hulls. Although a few hulls may be shattered by the roller milling to form slivers, there are not as many slivers formed as by other grinding methods, e.g. pin milling. The vast majority of the hull particles formed by roller milling are irregular in shape and bigger than slivers.

From the mill, the ground brewer's spent grain is transferred to a continuously operating slow speed reed-hung sifter such as that used in flour mills. The sifter is provided with a No. 36 light wire sieve having openings of about 500 microns. The sieve retains virtually all of the roller ground hull particles including whatever slivers may be present. The purified hull-free fraction which is collected is essentially a bran product which has a high fiber content and a protein content of about 33%.

The BSG bran can be used in the bread-making process if it is first thoroughly mixed with oil and a surfactant, preferably in a mill, before adding the other bread ingredients. Unless this method of mixing is employed, the bread has poor volume, grain and texture.

The methods of the present invention are further illustrated by the experimental work which is described below.

MATERIALS AND METHODS

Brewer's Spent Grain

Commercial samples of BSG were provided by the Miller Brewing Co., Milwaukee, Wis. The BSG had been dried to a moisture content of about 9% and contained no hop residue.

Milling

Three different grinding machines were studied: the Mikro-Bud grinder, which is a pin mill with a built-in air classifier; the Alpine pin mill, which is a one pass, high-speed pin mill; and a roller mill.

The air being drawn through the classifier of the Mikro-Bud grinder can be adjusted by changing a slide valve in the suction line. The classifier speed can be varied from 500 to 1500 rpm. The speed of the Alpine pin mill can be varied, but was used only at 14000 rpm in this study.

The roller mill used was from Ross Machine and Mill Supply, Oklahoma City, OK, and has a roll size of 6"33 6" (diameter × length). The rolls were corrugated with 22 corrugations/inch. The fast roll speed is set at 435 rpm. The slow roll speed can be varied from 100 to 336 rpm, thus giving a variable differential from 4.35 to 1.3.

All sifting was done on a Richmond lab sifter with a sieve size of 12¼"×15¼", a throw of 2", and a speed of 290 rpm. For all data reported, the sifter was run for four minutes with a sample size of 500 g.

Scanning Electron Microscope

BSG and milled fractions of BSG were viewed and photographed with a scanning electron microscope (SEM). For comparison, barley hulls and barley which had been hand dissected with a razor blade were also viewed. Fine material (smaller than farina sized particles) were stuck to the microscope stubs using double stick scotch tape. Coarse material (farina sized particles or larger) were glued to the stub with silver paste. All samples were coated, under vacuum, with a layer of carbon and then with a layer of goldpalladium of approximately 60 A and 100 A thickness, respectively. Photographs were taken with Polaroid Type 55 film on an ETEC U-1 Autoscan SEM operated at an accelerating voltage of 5 kv.

Flour

Two different wheat flours were used during the course of the baking studies. One was BCS 79 which is a research flour milled from a composite of hard red winter wheats grown throughout the Great Plains. The other flour used was Kansas State University (KSU) flour which is a hard red winter wheat flour milled on the KSU pilot mill. Analytical and baking characteristics of BCS 79 and KSU flour are given in Table I.

Baking

The bread formula used is shown in Table II. It was a straight dough pup loaf baking procedure. Doughs were handled and baked according to the procedure of Finney and Barmore (1943). In this procedure doughs are punched after 105 and 155 minutes and panned after 180 minutes fermentation. Loaf volume and weight were measured and recorded immediately after coming out of the oven.

Resistance Oven

Baker (Cereal Chem. 16:513, 1939) has described a method in which bread was baked in a resistance oven. In the resistance oven the dough piece was placed between two stainless steel plates (electrodes). The plates were coated with an alcoholic solution of quinhydrone to decrease electrical resistance at the plate and dough interface. The plates were wired to a variable transformer which was set to provide 84 volts across the plates. When the transformer is on, a current passes through the dough. The dough is heated by its resistance to the current flow. An advantage of the resistance oven for research is that the dough heats uniformly throughout instead of from the outside of the dough to the center.

The resistance oven was constructed from ¼" plexiglass so the dough could be watched as it baked. A centimeter scale was attached to each end of the oven and by sighting from one end to the other, the height of the baking loaf could be accurately determined.

Doughs were made with the same formula as used in the pup loaf baking studies except that 2.0 g. salt was used instead of 1.5 g. Shortening, oil, surfactant, and sugar were all added in varying amounts, as experimental variables.

The doughs were baked in the resistance oven for 18 minutes and the height was recorded at 30 second intervals. The loaf heights were plotted against baking time.

Lyophilizing and Lipid Extraction of BSG Doughs

Bread doughs of the same formula used in the baking studies, except that yeast was left out, were mixed to optimum development in a National pin mixer. Immediately after mixing, the dough was placed in a Waring blender with 250 ml distilled water and blended for 10 seconds at low and 15 seconds at high speed. This totally dispersed the dough. The suspension was centrifuged for 20 minutes at 1600 x g.

After centrifugation, the solids in the centrifuge tube were in layers. The layers were separated with a spatula, frozen, and lyophilized. Each fraction was ground in a Stein mill and analyzed for moisture, protein, ash, and lipid. The lipid analysis was done by a soxlet extraction with petroleum ether.

RESULTS AND DISCUSSION

A. Milling

A visual examination of brewer's spent grain (BSG) shows that it consists of two very different fractions. One fraction, the hulls, is relatively large in particle size and fibrous and abrasive in texture. The other fraction, the barley pericarp, is darker brown in color, smaller in particle size, and much softer and more amorphous in texture.

Because of their abrasive texture, the hulls are undesirable for use in food. Therefore, the first work we undertook was milling the brewer's spent grain. The objective of the milling studies was to find a method for separating the pericarp residue (bran) from the hulls.

BSG was ground with the Mikro-Bud grinder, the Alpine pin mill, and the roller mill. The product from each mill was sifted and the resulting fractions were weighed and subjectively judged for purity of bran or hulls. The milling data is shown in Table III.

During milling the BSG hulls had a tendency to break into long narrow slivers. The slivers, by standing on end, would pass thru sieves that had openings much smaller than the length of the sliver. This made separation difficult. The roller mill did not break as many of the hulls into slivers as did either of the two impact mills and was better suited for a bran-hull separation process. The rolls were studied at differentials of 2.5, 3.0, 3.5, and 4.0 and with various roll settings (distance between rolls). A visual subjective evaluation was made of the stock produced by each differential-roll setting combination. The best combination was 3.0 differential and a "tight" setting, i.e., the rolls would just touch if there was no stock running between them. With this differential and setting, one pass thru the rolls was sufficient to free the bran from the hulls so that the remaining separation problem was one of sifting and not of grinding.

When the BSG that had been ground once on the rolls was sifted, there was a natural break between a 22 wire (818 m) and 36 wire (500 m) sieve. The overs of the 22 wire fraction was 27% of the total BSG and was virtually all hulls. The fraction passing thru the 22 wire and staying over the 36 wire was 22% of the total BSG and was a mixture of hulls and bran. The thrus of the 36 wire was bran and was pure enough that no further separation was deemed necessary. The preferred process is illustrated in FIG. 1.

The protein of the unmilled BSG was 25.6%, the protein of the bran fraction was 34.7% and that of the hulls was 9.7%.

The highest and lowest protein contents obtained on any of the milling fractions were 39.9% for bran and 6.6% hulls, respectively. If the bran is assumed to be totally homogeneous and to have a protein content of 39.9%, and if the hulls are assumed to be totally homogeneous and to have a protein content of 6.6%, then the protein content of any BSG fraction can be used to calculate the composition (in terms of bran and hulls) of the BSG fraction. Evidence was found with the scanning electron microscope that the bran fraction contains some aleurone cells and is therefore not totally homogeneous. The brewer's spent grain bran was used in all baking studies. No further work was done with the hulls.

Scanning Electron Microscope

The BSG milling fractions were examined with a scanning electron microscope. For comparison, barley and barley hulls dissected by hand with a razor blade were also examined. The BSG hulls appeared to be unaffected by the brewing process and were virtually indistinguishable from hulls removed with a razor. The outside of the hulls can be distinguished from the inside by the many bumps (probably hair cells) on the outside surface. The inside surface of the hulls tends to attract debris (probably electrostatically) when the BSG is milled. The cell structure of the barley pericarp (called bran in the milling description) is modified in the brewing process. There were only a few aluerone cells present in the BSG. Most of the aleurone cells were apparently lost in the brewing process. Stock which has passed through a 30 wire sieve contains several hull slivers which are longer than the size of the seive opening.

B. Baking

Conventional and Resistance Oven Baking

Water absorption increased dramatically when brewer's spent grain bran (BSGB) was included in the baking formula. When 15 g of flour was replaced by 15 g of BSGB the optimum absorption increased by 15% and 16% for the BCS 79 and KSU flour, respectively.

The spent grains apparently do not absorb this water immediately. At these high absorptions, doughs out of the mixer felt sticky and wet. However, by first punch, the BSGB doughs felt optimum in water but were weaker than the control doughs.

The high absorptions were necessary to produce optimum bread. The weights and volumes of BSGB loaves baked different absorptions are shown in Table IV. The loaves with absorptions lower than the optimum absorption not only had lower volumes but also had rounded, pulled in corners characteristic of bread baked with too little water. The loaf weights listed in Table IV show that the extra water was retained through baking.

Bread loaf volume is affected by the quality and quantity of gluten protein in the loaf. If the wheat variety (gluten quality) is held constant, the relationship between flour protein and loaf volume is approximately linear above 8% flour protein. Therefore, it is possible to predict the loaf volume which would be expected if the spent grains have no loaf volume depressing effect. The BSC 79 flour has 12.2% protein and a control loaf volume of 950 cc. The BSC 79 flour has a loaf volume potential of 75 cc/g protein. The treatment loaves have 15% less protein than the controls. Therefore, it was possible to calculate that the treatment loaves should have a loaf volume of $0.15 \text{ c } 12.2 \times 75 = 140$ cc less than the control loaves. The actual difference (255 cc) as shown in Table IV was larger than this and indicated that the BSGB has a volume depressing effect.

Surfactants (surface active agents) are a class of chemicals which act at interphase surfaces (gas-liquid, water-fat) in food systems. For reasons that are not entirely understood many surfactants improve the grain and loaf volume of bread. The improving effect of surfactants is generally greater for breads containing some form of non-gluten protein (such as wheat bran or BSGB) than for white bread which contains relatively small amounts of non-gluten protein.

BSGB bread was baked with six different surfactants included at different concentrations in the formula. In all cases the surfactants were simply added with the dry ingredients. It is possible that a different method of addition, such as melting with the shortening or grinding with the BSGB in a Stein mill, would have improved the performance of some of the surfactants. The data showing the baking performance of the six surfactants are presented in Table V. Sodium stearoyl lactylate (SSL) at levels of 1.5 and 2.0%, flour basis, improved the loaf volume of the BSGB loaves to where it was essentially equal to the theoretical maximum of 810 cc. At 0.5% concentration four other surfactants. Tween 60, triglycerol monoglycerides, Pluronic P-108, and ethoxylated monoglycerides, performed as well, or very nearly as well as did SSL, but no surfactant performed better than SSL.

Because SSL is one of the most commonly used surfactants and because it performed as well as any other at the 0.5% level, we decided to use SSL for the remainder of our baking studies. The results from baking with SSL at 1.5 and 2.0% flour basis showed that loaves containing 15 g BSGB/85 g flour can be made with loaf volumes at the theoretical maximum and with good grain and texture. But, legally, SSL cannot be used at levels higher than 0.5% flour basis. Therefore, it would be desirable to have a treatment which would produce BSGB loaves with good volume, grain and texture and would not require a high level of a surfactant such as SSL.

Loaves containing BSGB and no surfactants had a grain similar to bread baked with no shortening. Adding 0.5% SSL improves the grain but a hint of the "no shortening" look remains. We postulated that there might be a lipophylic fraction in the BSGB that was taking a lipid component away from the rest of the dough. In an attempt to saturate the lipophylic fraction of the BSGB, corn oil was added to the formula. The corn oil and SSL each were added in two different ways; (A) to the dry ingredients and (B) mixed separately with the BSGB in a Stein mill. The results of adding oil and SSL are shown in Table VI and Table VII. Adding the oil and SSL in a Stein mill improved both loaf volume and crumb grain. Additional bakes to determine optimum levels of ingredients are summarized in Table VIII. The optimum level of oil was 0.7% based on the weight of the composite flour. With 0.5% oil and 0.5% SSL reducing the shortening to 2.0% had no noticeable effect, but when the shortening was reduced to 1.0% the grain became inferior and the volume dropped slightly.

The volume produced by the defatted BSGB and regular BSGB were essentially equal, but the grain with the regular BSGB was judged slightly better. When treated with oil and SSL, the defatted BSGB loaves showed less increase in volume than did the regular BSGB loaves. In addition, the regular BSGB loaves had better crumb grain than the corresponding defatted BSGB loaves.

Adding 0.7 g of corn oil and 0.5 g SSL to the BSGB in the Stein mill produced bread with close to the theoretical maximum volume and with good grain and texture (the "no shortening" look has disappeared).

The resistance oven was used to investigate the improving effect of oil and SSL on bread containing BSGB. Loaf height versus baking time curves for a control dough (no RSGB) and a dough containing BSGB, but no special treatment, are shown in FIG. 14. It can be seen that the BSGB loaf has a slightly higher proof height than the control and that the two loaves expand at approximately the same rate during the initial stage of baking. The reason for the greater final height of the control is that it did not stop expanding until about two minutes after the BSGB loaf had stopped expanding. The time that a loaf in a resistance oven stops expanding is the time starch gelatinization takes place. The fact that the BSGB loaf stops expanding earlier than the control loaf is therefore an indication that the starch in the BSGB loaf gelatinized earlier (at a lower temperature) than the starch in the control loaf.

Doughs containing 0% or 0.5% SSL, and 0% or 0.7% oil were baked in the resistance oven. All possible combinations of the three ingredients at the two levels of each gave eight different treatments.

When 3% shortening and 0.5% SSL are present, the addition of 0.7% oil made virtually no difference in the dough's performance in the resistance oven, which indicated that the oil does not have much of a volume improving effect on a dough that contains shortening and SSL. The dough containing both shortening and oil gave a slightly higher height versus time curve than did the dough containing shortening and no oil. The height for the dough containing oil plus SSL was much higher than the height for the dough containing SSL and no oil. The effect appears to be primarily because the dough containing the oil plus SSL had a better oven spring than did the dough containing SSL alone. The height for the dough with oil alone added is slightly higher than the height for the dough with no added lipid. The greatest height of dough baked with the resistance oven was for the dough containing oil plus SSL with no shortening. It is slightly higher than the dough containing shortening plus oil plus SSL or shortening plus SSL. The difference is slight and may not be real. The data tend to indicate that the volume potential for BSGB bread which has had SSL and additional lipid added is the same regardless of the type of additional lipid.

In some instances data from resistance oven baking and from conventional oven baking did not agree. The resistance oven baking data indicate that a BSGB loaf containing 3% shortening and 0.5% SSL should have the same volume, regardless of whether or not 0.7% oil is also present. The conventional oven baking data shown in Table VII shows that a BSGB loaf having 3% shortening, 0.5% SSL and 0.5% oil has a higher loaf volume than a BSGB loaf having 3% shortening, 0.5% SSL, and no oil.

The general trend that adding shortening and/or SSL to bread containing BSGB causes an increase in loaf volume is true for both conventional and resistance oven baking. We used the resistance oven to bake doughs with 0, 3, and 6% shortening and 0, 0.5, and 2.0% SSL. Increases in height came from increases in level of shortening and from delaying the time at which the loaf stopped expanding.

The mechanism through which shortening and SSL improve the loaf volume and crumb structure of BSGB bread is probably quite complex. Though numerous reports have been published, the nature of the actions and interactions of wheat flour lipids, shortening, and surfactants in the bread-making process is not clear. Native wheat flour lipids and added shortening each affect loaf volume and crumb grain, but probably by different mechanisms. Interactions between shortening and wheat flour lipids occur, but depend on the quality of the flour lipids.

In petroleum ether-defatted flours, the addition of nonpolar lipids has a detrimental effect, and the addition of glycolipids has an improving effect on bread quality. Addition of free fatty acids has been shown to have harmful effects on the breadmaking properties of both petroleum ether defatted flour and untreated flour (De Stefanis and Ponte, Cereal Chem. 53:626, 1976).

Polar lipids are generally recognized as being beneficial to breadmaking, however, their beneficial effect depends upon their quantity and quality. When 0.3% free polar lipids (rich in glycolipids) were added to petroleum ether defatted flour (containing 0.6% bound polar lipids) and bread was made, the resulting loaf volume was comparable to the loaf volume given by the original flour when baked with 3% shortening (Horseney, et al.; Cereal Chem. 46:6061, 1969). Adding 0.2% bound polar lipids (about equal in phospholipids and glycolipids) to the petroleum ether defatted flour caused no improvement in loaf volume over that given by the extracted flour. Small amounts of polar lipids have been shown to be detrimental and larger amounts of the same polar lipids have been shown to be beneficial when added to an almost completely defatted flour and baked with 3% shortening.

When shortening is added to bread, crumb grain is improved and loaf volume is increased. Bell, et al. (Food Chem. 2:57, 1977) reviewed several hypothetical physical mechanisms for the shortening effect. Among the hypothesis examined were lubrication, lipoprotein structures in gluten, pore-sealing, and structural support. Not one of the individual mechanisms was thought to explain all aspects of the shortening effect but physical mechanisms were thought to be more probable than the chemical mechanism of lipid oxidation. Bell, et al. stated that for nonpolar lipids to exert a full improving effect, a certain minimal amount of the shortening must remain solid at the temperatures of mixing and proofing. Castor oil improves loaf volume in the chorleywood bread process and is an exception to the general requirement for a solid shortening.

Lipid related surfactants act as antistaling agents and dough modifiers in bread and can replace all or part of the shortening needed to produce good bread. In doughs containing high protein additives, such as soy flour, surfactants cause an even larger improvement than in white bread.

As noted earlier, it was observed that loaves containing BSGB stopped expanding at an earlier time (starch gelatinized earlier) than control loaves. This is probably because of the extra water added to the BSGB doughs. The additional water would be expected to make the starch granules gelatinize at a lower temperature.

Sugars are known to delay starch gelatinization and disaccharides are known to have a greater delaying effect than monosaccharides. The gelatinization delaying effect of sugars has been shown by fiscosity measurements (Bean and Osman, Food Res. 24:665 1959) and with photomicrographs. A differential scanning calorimeter has been used to show the gelatinization delaying effect of sugar and to show definitively that the mechanism for the effect was not the decrease in water activity caused by sugar.

BSGB doughs were made with 12% sugar. The high sugar content caused the doughs to be sticky and more slack than normal, indicating that the dough contained an excess of water. To alleviate this condition the dough water was dropped from 77% to 75%.

To determine the effect of the lowered water a control (15% BSGB, 6% sugar, 75% water) was baked and the lower water caused a delay in the setting of the loaf. This might be expected because there was much less free water in the system. However, oven spring was much slower in the dry dough and the loaf height was lower than that for dough with 77% water. For doughs containing 75% water, increasing the sugar from 6% to 12% and from 12 to 15% caused a progressive delay in the setting of the loaves. The oven spring was essentially the same for the three sugar concentrations so the loaf height was in spite of the fact that there was diminished yeast activity in the high sugar doughs (lower dough heights at first punch).

The data with the resistance oven was checked by baking in a conventional oven (Table IX). There was a steady improvement in both loaf volume and crumb grain as the level of shortening or SSL was increased. Adding oil to the BSGB dough containing 3% shortening and 0.5% SSL again caused a slight improvement in grain and a slight increase in loaf volume (Table X).

Baking data indicated that yeast activity was depressed when sugar concentration was increased from 6 to 12%. Gas production data indicated that a yeast concentration of 2 3/8% in a dough with 12% sugar and 75% water gave about the same yeast activity as a dough with yeast, sugar, and water levels of 2.0, 6.0, and 77%, respectively.

As mentioned earlier, increasing sugar concentration caused an increase in slackness and stickiness of dough. This indicated that the optimum water level for dough having 12% sugar would be less than the 77% used with 6% sugar.

To optimize the yeast and water levels for 12% sugar, BSGB doughs were baked with various water levels (Table XI). The optimum absorption was found to be 75%. At the 75% water level, the three yeast concentrations performed equally well.

The formula modifications which improved the quality of bread containing BSGB also had another effect. Increasing water, increasing shortening, increasing sugar, and adding SSL all for several BSGB doughs were run to document the mix time lengthening effect and gain insight into its nature. It was shown that the BSGB dough offered virtually no resistance to the mixer for a considerable time after mixing was begun. The doughs developed very slowly until a certain critical development was reached, after which development was much more rapid.

For all BSGB doughs, the viscosity was at or very nearly at its maximum within four minutes after the curve first crosses the third horizontal line from the bottom of the mixograph. The control dough crossed this third line quickly but then took another 6 ½ or 9 minutes to reach peak development for the flour water and fully formulated doughs respectively. The increase in mix time of the BSGB doughs over the control, and of some BSGB doughs over others, was due to the long lag time from when the mixer was started till enough consistency is achieved to cross the third line. It was hypothesized that this lag time was due to the time taken by the BSGB in soaking up the large amount of water in the dough.

Doughs were made fo which the 15 g BSGB were soaked for two hours with 25 ml of water before being mixed. Mix time was reduced somewhat. BSGB bread was made by a sponge and dough procedure and the BSGB was added to both the sponge and the dough. Mix time was greatly reduced in each case and was only slightly longer than the control. Mix times for the straight dough with the soaked BSGB and for the sponge and dough procedure are shown in Table XII.

Lyophilizing and Lipid Extraction of BSGB Doughs

When developed bread doughs were dispersed in water and centrifuged the solid dough components settled in layers in the centrifuge tube. The top layer contained the gluten and the bottom layer the starch. If spent grain bran was present in the formula, it was found as a layer between the gluten and starch fractions. The border between the gluten and BSGB layers was indistinct. The gluten-starch boundary with control doughs and BSGB-starch boundary in the BSGB dough were clear and distinct.

The proximate analysis of fractions from control and BSGB doughs are shown in Tables XIII and XIV. The masses and concentration of extractable lipids, and mass balance of extractable lipids are also shown.

The yield of the dough fractions are somewhat surprising. The weight of gluten is approximately the same for the control and BSGB doughs even though there was 15% less flour used in the BSGB doughs. There was only 12.9 g BSGB (dry basis) added to each BSGB dough but the weight of the BSGB layer recovered after centrifuging was over twice that amount. The extra weight apparently came from the starch. The wieght of the starch fraction in the BSGB doughs was only slightly over half of the starch weight from the control doughs.

Subtracting the lipid extracted from a no shortening dough from that extracted from the corresponding dough with 3% shortening gave the following results: control—1.85 g, BSGB, no treatment—2.61 g, BSGB with 0.7 oil and 0.5 g SSL—2.9 g.

The values for the two BSGB doughs are approximately equal but the value for the control is significantly lower. The fact that only 1.85 g of 3 g shortening added is recovered from the control dough shows that the flour is binding the shortening. The BSGB is apparently filling the sites that normally bind the shortening and thereby causing less to be bound. When 0.7 g oil and 0.5 g SSL are added more binding sites are filled and more of the added shortening is recovered.

This explanation agrees with the observations of Olcott and Mecham (Cereal Chem. 24:407, 1947). They showed that when flour is wetted the fraction of total lipids extractable with ether decreases from 70% to 30% and when the flour is mixed into a dough the ether extractable lipids are only 6% of the total. But, they also showed, when lipids are added to the dough the flour's capacity to bind lipids is apparently saturated at somewhere between 3 and 7% added lipids. When lipids are added in excess of this amount, the fraction of the total dough lipids extractable by ether increases rapidly.

TABLE I

Analytical and Baking Data for BCS 79 and KSU Flour Used in Baking Studies.

|  | BCS 79 | KSU |
|---|---|---|
| % Protein (N × 5.7) | 12.2 | 11.4 |
| % Ash | 0.4 | 0.4 |
| % Moisture | 12.4 | 13.5 |
| % Optimum: Absorption (%) | 61.2 | 60.3 |
| $KBrO_3$ (ppm) | 20.0 | 5.0 |
| Mix time (min) | 4.25 | 6.5 |
| Control loaf volume (cc) | 950.0 | 880.0 |

TABLE II

Control and Treatment Bread Formulas Used in Baking Studies.

| Control | Treatment |
|---|---|
| 100 g (14% MB) flour | 85 g (14% MB) flour |
| 6 g sugar | 15 g (14% MB) BSG bran |
| 1.5 g salt | 6 g sugar |
| 4 g NFDM | 1.5 g salt |
| 3 g shortening | 4 g NFDM |
| 2 g yeast | 3 g shortening |
| $KBrO_3$ optimum | 2 g yeast |
| Water optimum | $KBrO_3$ optimum |
| Malt optimum | Water optimum |
|  | Malt optimum |
|  | Treatment additives |

TABLE III

Sifting Date for Brewers Spent Grains Ground on Different Milling Machines.

| Seive Thru | Over | Grinding Machine | | | |
|---|---|---|---|---|---|
|  |  | None | Alpine | Mikro-Bud[a] | Rolls[b] |
|  |  | % of Original BSG | | | |
| — | 20 wire (910 m) | 51.3 | 0 | 2.3 | 13.6 |
| 20 wire (910 m) | 62 wire (308 m) | 43.3 | 12.2 | 25.7 | 54.1 |
| 62 wire | 84 wire | 3.3 | 15.1 | 17.8 | 17.1 |

TABLE III-continued

Sifting Date for Brewers Spent Grains Ground on Different Milling Machines.

| Seive Thru | Over | Grinding Machine | | | |
|---|---|---|---|---|---|
| | | None | Alpine | Mikro-Bud[a] | Rolls[b] |
| | | % of Original BSG | | | |
| (308 m) 84 wire | (216 m) 10xx | 1.4 | 34.5 | 24.0 | 9.9 |
| (216 m) 10 XX | (130 m) Pan | 0.5 | 35.8 | 29.8 | 4.6 |
| (130 m) Total Recovery | | 99.8 | 98.6 | 99.6 | 99.3 |

[a] At 500 rpm with air setting at 2.5
[b] Differential set at 3.0

TABLE IV

Baking Data for BSGB Bread Baked at Different Water Absorptions.

| Absorption | Loaf Weight g | Volume cc |
|---|---|---|
| 63 (control) | 147 | 950 |
| 68 | 156 | 590 |
| 70 | 156 | 600 |
| 72 | 157 | 645 |
| 74 | 157 | 685 |
| 76 | 160 | 690 |
| 78 | 160 | 695 |

TABLE V

Baking Data for Certain Surfactants Added to the Dough containing BSGB

| Surfactant | % | Loaf Weight g | Volume cc |
|---|---|---|---|
| Control 1 (no BSGB, no surfactant) | — | 148 | 950 |
| Control 2 (BSGB but no surfactant) | — | 165 | 670 |
| SSL | 0.5 | 163 | 755 |
| SSL | 1.0 | 162 | 755 |
| SSL | 1.5 | 164 | 805 |
| SSL | 2.0 | 163 | 805 |
| Pluronic F-108 | 0.5 | 164 | 740 |
| Pluronic F-108 | 1.0 | 164 | 695 |
| Pluronic F-108 | 1.5 | 165 | 660 |
| Pluronic F-108 | 2.0 | 170 | 635 |
| Ethoxylated Monoglycerides | 0.5 | 164 | 735 |
| Monoglycerides | 0.5 | 162 | 710 |
| Tween-60 | 0.5 | 162 | 760 |
| Triglycerol Monoglycerides | 0.5 | 163 | 750 |

TABLE VI

Effect of Oil and SSL on Quality of Bread Containing BSGB

| Oil[a] | SSL[b] | Loaf Weight g | Volume cc |
|---|---|---|---|
| Control: | | 146 | 950 |
| — | — | 162 | 685 |
| — | 0.5 | 163 | 735 |
| 0.5 | — | 163 | 700 |
| 0.5 | 0.5 | 163 | 785 |

[a] added in a Stein mill.
[b] added directly to the dough and not in a Stein mill.

TABLE VII

Baking Data for Corn Oil and SSL Added to the Dough Containing BSGB

| Treatments | | Loaf | |
|---|---|---|---|
| Oil % | SSL % | Weight g | Volume cc |
| — | —(control no BSGB) | 145 | 950 |
| — | — | 160 | 705 |
| — | 0.5 | 162 | 740 |
| — | 0.5[a] | 161 | 760 |
| 0.5 | 0.5 | 162 | 760 |
| 0.5 | 0.5[a] | 162 | 770 |
| 0.5[a] | 0.5 | 161 | 795 |
| 0.5[a] | 0.5[a] | 161 | 790 |

[a] added to the BSGB in a Stein mill.

NOTE: The grain of the bread to which both the SSL and oil were added in the Stein mill was judged slightly superior to that in which the oil was added in the Stein mill and the SSL added normally.

TABLE VIII

Baking Data for Various Levels of Shortening, Corn Oil, and SSL in Loaves Containing 15 grams of BSGB

| Treatments | | | Loaf | |
|---|---|---|---|---|
| Fat % | Oil[a] % | SSL[a] % | Weight g | Volume cc |
| Control | | | | |
| 3.0 | — | — | 146 | 950 |
| Regular BSGB | | | | |
| 3.0 | — | — | 158 | 700 |
| 3.0 | 0.4 | 0.5 | 161 | 770 |
| 3.0 | 0.5 | 0.5 | 161 | 790 |
| 3.0 | 0.6 | 0.5 | 162 | 790 |
| 3.0 | 0.7 | 0.5 | 162 | 815 |
| 3.0 | 0.8 | 0.5 | 163 | 800 |
| 3.0 | 0.9 | 0.5 | 162 | 805 |
| 3.0 | 1.0 | 0.5 | 162 | 805 |
| 2.0 | 0.5 | 0.5 | 161 | 805 |
| 1.0 | 0.5 | 0.5 | 161 | 775 |
| Defatted BSGB | | | | |
| 3.0 | — | — | 162 | 700 |
| 3.0 | 0.5 | 0.5 | 162 | 760 |

[a] added in a Stein mill

TABLE IX

Effect of Shortening and SSL on Loaf Volume of Bread Containing Brewers Spent Grain Bran.

| Shortening (%) | SSL (%) | Loaf Weight (g) | Volume (cc) |
|---|---|---|---|
| 3 (control) | — | 144 | 880 |
| 0 | 0 | 155 | 665 |
| 0 | 0.5 | 157 | 705 |
| 0 | 2.0 | 157 | 735 |
| 3 | 0 | 156 | 710 |
| 3 | 0.5 | 157 | 745 |
| 3 | 2.0 | 160 | 785 |
| 6 | 0 | 160 | 750 |
| 6 | 0.5 | 159 | 780 |
| 6 | 2.0 | 161 | 815 |

Data in Table IX and X are from the same bake. Flour is KSU flour.

TABLE X

Effect of Oil on Loaf Volume of Bread Containing Brewers Spent Grain Bran.

| | Shortening (%) | SSL (%) | Oil[a] (%) | Loaf Weight (g) | Volume (cc) |
|---|---|---|---|---|---|
| no BSGB | 3 | — | — | 144 | 880 |
| BSGB | 3 | 0.5 | — | 157 | 745 |

TABLE X-continued

Effect of Oil on Loaf Volume of Bread Containing Brewers Spent Grain Bran.

| | Shortening (%) | SSL (%) | Oil[a] (%) | Loaf Weight (g) | Loaf Volume (cc) |
|---|---|---|---|---|---|
| BSGB | 3 | 0.5 | 0.7 | 157 | 765 |

[a]Added to the BSGB in a Stein mill.
Data in Table IX and Table X are from the same bake.
Flour is KSU flour.

TABLE XI

Effect of Water and Yeast Levels on Loaf Volumes of Bread with 15% BSGB and 12% Sugar.

| Yeast (%) | Water (%) | Loaf Weight (g) | Loaf Volume (cc) |
|---|---|---|---|
| Control | | | |
| 2 | 61 | 144 | 880 |
| BSGB Bread With 12% Sugar | | | |
| 2¼ | 69 | 161 | 685 |
| 2¼ | 71 | 162 | 720 |
| 2¼ | 73 | 165 | 740 |
| 2¼ | 75 | 166 | 770 |
| 2⅜ | 69 | 161 | 710 |
| 2⅜ | 71 | 160 | 735 |
| 2⅜ | 73 | 163 | 765 |
| 2⅜ | 75 | 164 | 770 |
| 2½ | 69 | 161 | 735 |
| 2½ | 71 | 163 | 755 |
| 2½ | 73 | 164 | 760 |
| 2½ | 75 | 163 | 775 |

Flour is KSU flour.

TABLE XII

Mixing Times of BSGB Doughs With Various Treatments.

| Absorption % | Sugar % | Shortening % | Oil % | SSL % | Mix Time (minutes) |
|---|---|---|---|---|---|
| Control (no BSGB) | 6 | 3 | — | — | 6.5 |
| 77 | 6 | 3 | — | — | 10.7 |
| 77 | 6 | 3 | — | 0.5 | 13.0 |
| 77 | 6 | 3 | 0.7 | — | 11.0 |
| 77 | 6 | 3 | 0.7 | 0.5 | 13.3 |
| 77 | 6 | 3 | — | 2.0 | 15.5 |
| 77 | 6 | 6 | — | — | 11.5 |
| 77 | 6 | 6 | — | 0.5 | 13.8 |
| 77 | 6 | 6 | — | 2.0 | 16.0 |
| 77 | 12 | 3 | — | — | 13.0 |
| 76 | 12 | 3 | — | — | 12.2 |
| 75 | 12 | 3 | — | — | 11.7 |
| Soaked BSGB | | | | | |
| 77 | 6 | 3 | — | — | 9.6 |
| Sponge and Dough Procedure | | | | | |
| Control (no BSGB) | | | | | 4.0 |
| BSGB added to sponge | | | | | |
| 77 | 6 | 3 | — | — | 5.5 |
| BSGB added to dough | | | | | |
| 77 | 6 | 3 | — | — | 4.8 |

TABLE XIII

Proximate Analysis and Mass Balance of Extractable Lipids From Doughs With 3% Shortening

| Dough | Fraction | Yield (g) | % Protein | % Ash | Lipid % | Lipid Grams |
|---|---|---|---|---|---|---|
| Control | gluten | 24.7 | 44.1 | 1.9 | 7.98 | 1.81 |
| | starch | 61.1 | 1.0 | 0.45 | 0.32 | 0.19 |
| | | 85.8 | | | | 2.00 |
| BSGB, | gluten | 24.2 | 39.4 | 2.1 | 9.61 | 2.43 |
| no treatment | BSGB | 31.1 | 15.3 | 1.3 | 3.06 | 0.95 |
| | starch | 31.1 | 15.3 | 0.48 | 0.37 | 0.12 |
| | | 86.4 | | | | 3.50 |
| BSGB, | gluten | 27.3 | 35.4 | 1.7 | 13.05 | 3.46 |
| 0.7 oil, 0.5 SSL | BSGB | 24.7 | 15.3 | 1.3 | 2.97 | 0.74 |
| | starch | 34.2 | 1.4 | 0.47 | 0.49 | 0.17 |
| | | 86.2 | | | | 4.37 |

Protein = N × 6.25 for BSGB.
Protein = N × 5.7 for gluten and starch.
All data are dry basis.

TABLE XIV

Proximate Analysis and Mass Balance of Extractable Lipids From no Shortening Doughs.

| Dough | Fraction | Yield (g) | % Protein | % Ash | Lipid % | Lipid Grams |
|---|---|---|---|---|---|---|
| Control | gluten | 24.7 | 41.6 | 1.8 | 0.27 | 0.067 |
| | starch | 60.1 | 0.9 | 0.42 | 0.14 | 0.084 |
| | | 84.8 | | | | 0.151 |
| BSGB, | gluten | 22.9 | 39.5 | | 1.51 | 0.364 |
| no treatment | BSGB | 30.2 | 15.5 | 1.4 | 1.69 | 0.510 |
| | starch | 31.1 | 1.5 | 0.47 | 0.11 | 0.034 |
| | | 84.2 | | | | 0.908 |
| BSGB, | gluten | 24.1 | 36.9 | 2.5 | 3.52 | 0.848 |
| 0.7 oil, 0.5 SSL | BSGB | 25.3 | 15.6 | 1.5 | 2.24 | 0.567 |
| | starch | 32.9 | 1.3 | 0.51 | 0.17 | 0.056 |
| | | 82.3 | | | | 1.471 |

Protein = N × 6.25 for BSGB.
Protein = N × 5.7 for gluten and starch.
All data are dry basis.

It will be apparent to those skilled in the art that the foregoing description has been for purposes of illustration and that a number of changes and modifications can be made without departing from the spirit and scope of the present invention. Therefore, it is intended that the invention not be limited except by the claims which follow:

We claim:

1. A method of preparing a bran from brewer's spent grain (BSG) which bran is suitable for use in products for human consumption comprises drying the BSG and milling the dried BSG in a roller mill having a differential of about 2.5 to about 4.0 and a tight setting so that the rollers just rub when no grain is passing through to separate the bran from the hulls, then passing the ground mixture through a sieve having openings of about 500 microns which retains the particles of hulls and collecting the product which passes through the sieve which constitutes the brewer's spent grain bran.

2. The method of claim 1 in which the roller mill differential is about 3.0.

* * * * *